United States Patent Office.

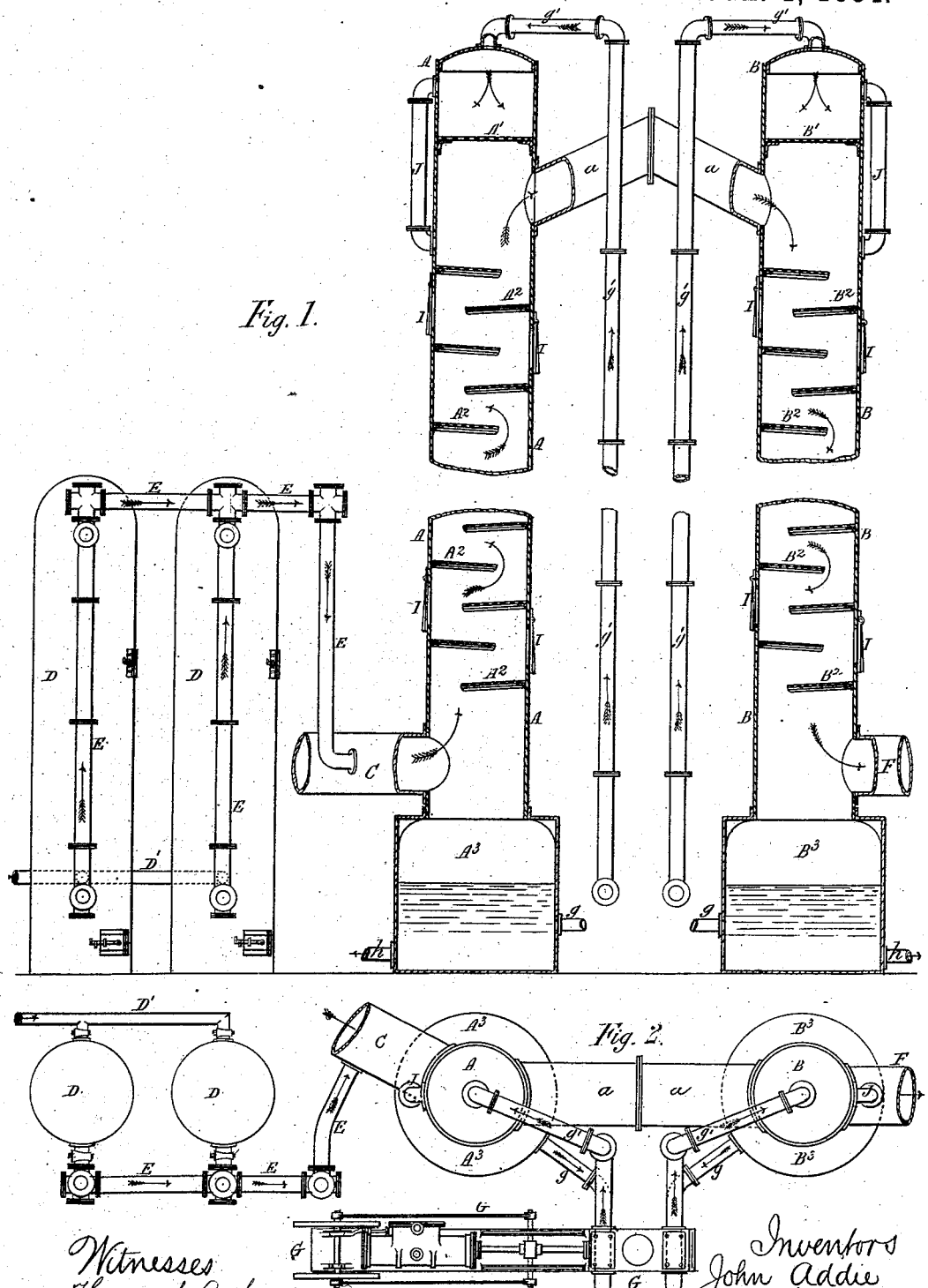

JOHN ADDIE AND JAMES ADDIE, OF GLASGOW, SCOTLAND.

PROCESS OF OBTAINING AMMONIA FROM FURNACE-GASES.

SPECIFICATION forming part of Letters Patent No. 291,264, dated January 1, 1884.

Application filed May 11, 1883. (No model.) Patented in England October 6, 1882, No. 4,758; in France April 3, 1883, No. 154, and in Belgium April 6, 1883, No. 60,995.

*To all whom it may concern:*

Be it known that we, JOHN ADDIE and JAMES ADDIE, both subjects of the Queen of Great Britain and Ireland, and residing in Glasgow, Scotland, have invented an Improved Process of Obtaining Ammonia from Furnace-Gases, (for which we have obtained a patent in Great Britain, dated October 6, 1882, No. 4,758; in France, dated April 3, 1883, and in Belgium, dated April 6, 1883,) of which the following is a specification.

This invention has for its object the fixing of the ammonia in the gases from blast-furnaces, as well as other furnaces and gas-producers, by means of an acid in the form of a gas or vapor, and subsequently condensing and recovering the compound thus formed. The acid we prefer to use is sulphurous acid; but sulphuric acid, in the form of gas or vapor, may also be used. We produce the sulphurous acid by the combustion of sulphur or any substance containing sulphur—such as pyrites, iron-stone rich in sulphur, or the spent oxide of iron from gas-works—and force or draw the sulphurous acid thus produced into the gases from the furnace, whereby a sulphite of ammonia (which may be more or less mixed with sulphate and hyposulphite of ammonia) is formed, and this compound we condense or dissolve in water. The ammonia thus condensed or dissolved may be subsequently converted into sulphate of ammonia; or it may be obtained in the free state by any of the usual methods. By the term "furnace-gases" employed herein we mean the gases or gaseous products resulting from the combustion, distillation, or coking of coal or other carbonaceous matter; and our invention is applicable to the treatment of such gases in their highly-heated state, as they come either from blast-furnaces, gas-producers, coking-ovens, retorts, or other furnaces.

The accompanying drawings, in which Figure 1 is an elevation, and Fig. 2 a plan, illustrate one modification of apparatus used in carrying out our invention.

This apparatus comprises two large scrubbers, A and B, to which the hot furnace-gases are led (either direct from the furnaces or after their heat has been partially utilized) by a large pipe, C, entering the first scrubber, A, at the lower end. In close proximity to the scrubbers are two retorts or chambers, D, wherein sulphurous-acid gas is generated by the combustion of sulphurous shale or of any other suitable material. A blast of air to force combustion is led by pipes D' into the retorts D. The sulphurous-acid gas therein generated is led off by a pipe or pipes, E, leading to and discharging into the pipe C, by which the furnace-gases are led to the scrubbers. By so connecting these pipes the sulphurous-acid gas combines with the ammonia in the furnace-gases and forms a sulphite of ammonia. The gases containing the sulphite of ammonia pass up through the first scrubber, A, and are washed by a descending stream of water which percolates through a spray-plate, A', and a series of perforated plates, $A^2$, a large proportion of the sulphite being absorbed or dissolved by the water in the scrubber. From the scrubber A the gases pass by a neck or pipe, $a$, connecting the two scrubbers, and descend through the second scrubber, B, in which they are washed by a second stream of water passing through the spray-plate B' and perforated plates $B^2$. In this scrubber the water absorbs or dissolves any sulphite of ammonia remaining in the gases. From the second scrubber the residual gases escape or are drawn off by a pipe, F, and may be utilized for heating or for other purposes, or be discharged into the atmosphere. The water used to absorb and dissolve the sulphite of ammonia in the furnace-gases passing through the scrubbers A and B collects in tanks or vessels $A^3 B^3$ at the lower end of each scrubber, and thence the liquor is withdrawn through pipes $g g$ by means of a pump, G, which forces the liquor up to the top of the scrubbers A B through pipes $g' g'$, and causes a continuous circulation through the scrubbers until the liquor in each is sufficiently saturated with the sulphite. The liquor is then run off through suitable pipes, $h$, separated from the tar or other products in it, and then treated to convert the sulphite into sulphate of ammonia, or otherwise utilized. Hinged and weighted doors I are fitted over openings in the sides of the scrubber to allow of escape of the gases when there is too great pressure inside. In case of the spray-plate becoming choked by the liquor in the upper end of the scrubber, pipes J are provided to lead the liquor from the upper to the under side of the spray-plates A' B'. The liquor in the first scrubber becomes more rapidly saturated than that in the second scrubber, and when it is run off the liquor in the second scrubber may be run into the first and fresh water circulated through the second. The furnace-gases may be passed through the scrubber A and washed with water to separate out the tar before the sulphite of ammonia is formed. In this case the sulphurous-acid gas may be admitted by a pipe entering the neck $a$, to combine with the furnace-gases and form the sulphite before or while the gases pass through the second scrubber, B. The sulphite will be collected from the tank of the second scrubber, and the tar and other products from the first scrubber.

In applying our process of recovering ammonia from furnace-gases which are afterward to be used for any process in which the presence of acid is objectionable—as, for example, the furnace-gases to be used in the manufacture of steel—we remove this acid by causing the furnace-gases to pass through a scrubber containing milk of lime or other alkali. Substantially the same arrangement of apparatus may be used to condense and recover the salt or compound formed when the ammonia in the furnace-gases is fixed by means of sulphuric-acid gas or vapor. The sulphuric acid, in the form of gas or vapor, may be obtained by the forced combustion of sulphate of iron; or other known methods may be adopted for obtaining the acid in the form of gas or vapor. The compound formed when sulphuric-acid gas or vapor is used to fix the ammonia in the furnace-gases will be sulphate of ammonia. Any other suitable arrangement of apparatus may be used to condense and recover the salts or compounds of ammonia formed by the process herein described.

We do not claim as new the arrangements of apparatus herein described and illustrated; nor, on the other hand, do we confine ourselves to any particular arrangement of apparatus for carrying out our invention; but What we do claim is—

The mode herein described of utilizing the gases from blast and other furnaces to recover the ammonia therefrom, said mode consisting in first fixing the ammonia in such gases after they leave the furnace by mixing therewith sulphurous acid or sulphuric acid in the form of gas or vapor, and then condensing or dissolving and recovering the salts or compounds thereby formed, substantially as set forth.

In testimony whereof we have signed our names to this specification in the presence of two subscribing witnesses.

JOHN ADDIE.
JAMES ADDIE.

Witnesses:
ARCHD. FRASER,
WALLACE FAIRWEATHER, C. E.,
96 *Buchanan Street, Glasgow.*